(12) United States Patent
Yoshioka

(10) Patent No.: US 11,544,307 B2
(45) Date of Patent: Jan. 3, 2023

(54) PERSONNEL SELECTING DEVICE, PERSONNEL SELECTING SYSTEM, PERSONNEL SELECTING METHOD, AND RECORDING MEDIUM

(71) Applicant: Panasonic Intellectual Property Corporation of America, Torrance, CA (US)

(72) Inventor: Kohsuke Yoshioka, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 24 days.

(21) Appl. No.: 16/388,290

(22) Filed: Apr. 18, 2019

(65) Prior Publication Data

US 2019/0332621 A1 Oct. 31, 2019

(30) Foreign Application Priority Data

Apr. 26, 2018 (JP) .............................. JP2018-084691

(51) Int. Cl.
*G06F 16/33* (2019.01)
*G06F 16/332* (2019.01)
(Continued)

(52) U.S. Cl.
CPC ........ *G06F 16/3344* (2019.01); *G06F 16/335* (2019.01); *G06F 16/338* (2019.01); *G06F 16/3329* (2019.01); *G06F 16/358* (2019.01)

(58) Field of Classification Search
CPC ............ G06Q 30/0282; G06Q 30/0631; G06F 3/048; G06F 16/3344; G06F 16/358; G06F 16/3329; G06F 16/338; G06F 16/335
See application file for complete search history.

(56) References Cited

U.S. PATENT DOCUMENTS

| 7,188,073 B1 * | 3/2007 | Tam ...................... G06Q 10/02 |
| | | 705/7.16 |
| 8,918,312 B1 * | 12/2014 | Rehling ............. G06Q 30/0282 |
| | | 704/9 |

(Continued)

FOREIGN PATENT DOCUMENTS

| JP | 2000-123036 | 4/2000 |
| JP | 2002-133003 | 5/2002 |

(Continued)

OTHER PUBLICATIONS

Iku Ohama, et al., "Discovering Relevance-Dependent Bicluster Structure from Relational Data", Proceedings of the Twenty-Sixth International Joint Conference on Artificial Intelligence (IJCAI-17), Aug. 2017, pp. 2578-2584.

*Primary Examiner* — Liang Y Li
(74) *Attorney, Agent, or Firm* — Wenderoth, Lind & Ponack, L.L.P.

(57) ABSTRACT

A personnel selecting device includes: a personnel extracting unit which obtains information of a requested service from a client device, extracts personnel matched to the information of the requested service by referring to a job skill storage which stores information indicating a correspondence relationship between a service and personnel, and outputs the extracted personnel information to the client device; a personnel arranging unit which obtains, from the client device, information of personnel selected from among the extracted personnel, and requests the requested service of the selected personnel; and an analyzing unit which obtains, from the client device, information indicating evaluation details for the requested service performed in natural language, determines an evaluation for the evaluation details by analyzing a character string indicated by the evaluation (Continued)

details, and updates the information in the job skill storage based on the determined evaluation.

8 Claims, 10 Drawing Sheets

(51) Int. Cl.
*G06F 16/335* (2019.01)
*G06F 16/35* (2019.01)
*G06F 16/338* (2019.01)

(56) References Cited

U.S. PATENT DOCUMENTS

| | | | | |
|---|---|---|---|---|
| 2003/0236700 | A1* | 12/2003 | Arning | G06Q 30/0282 705/347 |
| 2008/0262995 | A1* | 10/2008 | Zweig | G06Q 30/02 |
| 2009/0271350 | A1* | 10/2009 | Feng | G06F 16/3322 706/47 |
| 2011/0282793 | A1* | 11/2011 | Mercuri | G06Q 30/0214 705/80 |
| 2014/0114876 | A1* | 4/2014 | Montano | G06Q 10/06398 705/347 |
| 2015/0142602 | A1* | 5/2015 | Williams | G06Q 30/0631 705/26.7 |
| 2016/0078521 | A1* | 3/2016 | Koymans | G16H 40/20 705/26.7 |
| 2016/0335603 | A1* | 11/2016 | Davar | G06F 16/28 |
| 2019/0237095 | A1* | 8/2019 | Duguid | G10L 25/54 |
| 2021/0182989 | A1* | 6/2021 | Esposito, II | G06Q 10/103 |

FOREIGN PATENT DOCUMENTS

| | | |
|---|---|---|
| JP | 2008-46690 | 2/2008 |
| JP | 2008-257541 | 10/2008 |
| JP | 2010-20390 | 1/2010 |
| JP | 2011-204226 | 10/2011 |
| JP | 5283288 | 9/2013 |
| JP | 2016-48488 | 4/2016 |
| JP | 2017-97498 | 6/2017 |

* cited by examiner

FIG. 3

PERSONNEL CANDIDATE LIST

| NAME | ADDRESS | AVAILABLE DATE | CHARACTERISTICS | |
|---|---|---|---|---|
| MR. A | W TOWN | TOMORROW AFTERNOON | WELL EXPERIENCED | : |
| MS. B | WITHIN THE TOWN | MORNING IN THREE DAYS TIME | GENIAL | : |
| MR. C | X TOWN | FIRST THING TOMORROW MORNING | GOOD REPUTATION | : |

● WHO WILL YOU SELECT?

SERVICE PERFORMANCE STATUS DB

| SERVICE PERFORMED | EVALUATION VALUE |
|---|---|
| PARCEL DELIVERY | +0.5 |
| GARDEN CLEANUP | +0.1 |
| ... | |
| PERSONAL CHARACTERISTICS ||
| GENTLE | POLITE |
| FAST WORKER | NOT THOROUGH ENOUGH |

FIG. 7

SERVICE AVAILABLE TIME INFORMATION

| ADDRESS | AA CITY | BB TOWN |
|---|---|---|
| DESTINATION | EARLIEST AVAILABLE TIME RANGE | SECOND TIME RANGE |
| OUTSIDE AA CITY | JANUARY 30, AM | FEBRUARY 2, ALL DAY |
| WITHIN AA CITY | JANUARY 28, AM | JANUARY 30, ALL DAY |
| WITHIN BB TOWN | JANUARY 28, ALL DAY | JANUARY 29, AM |

FIG. 8

EXAMPLE OF SIMILAR SERVICE REFERENCE DB

| INPUT SERVICE | SIMILAR SERVICE 1 | SIMILAR SERVICE 2 | SIMILAR SERVICE 3 | SIMILAR SERVICE 4 |
|---|---|---|---|---|
| PARCEL DELIVERY | PARCEL COLLECTION | GARDEN CLEANUP | TAKING OUT GARBAGE | PERSONAL SHOPPER |
| PARCEL COLLECTION | PARCEL DELIVERY | GARDEN CLEANUP | TAKING OUT GARBAGE | PERSONAL SHOPPER |
| ... | ... | ... | ... | ... |
| ROOM CLEANUP | GARDEN CLEANUP | TAKING OUT GARBAGE | PERSONAL SHOPPER | CHANGING ELECTRICAL ITEMS |
| GARDEN CLEANUP | ROOM CLEANUP | TAKING OUT GARBAGE | DOG WALKING | PERSONAL SHOPPER |

FIG. 9

EVALUATION KW REFERENCE DB

| KW | EVALUATION |
|---|---|
| GOOD/WAS GOOD | +1 |
| SATISFIED | +1 |
| WOULD LIKE TO (ASK/REQUEST) (AGAIN/ANOTHER TIME/NEXT TIME) | +2 |
| DISAPPOINTED | −1 |
| BAD/NOT GOOD | −1 |
| WILL (NEVER/ABSOLUTELY NOT) (ASK/REQUEST) AGAIN | −2 |
| VERY | DOUBLE EVALUATION SCORE |
| TERRIBLE | −2 |

PERSONNEL SELECTING DEVICE, PERSONNEL SELECTING SYSTEM, PERSONNEL SELECTING METHOD, AND RECORDING MEDIUM

CROSS REFERENCE TO RELATED APPLICATION

This application claims the benefit of priority of Japanese Patent Application Number 2018-084691 filed on Apr. 26, 2018, the entire content of which is hereby incorporated by reference.

BACKGROUND

1. Technical Field

The present disclosure relates to a personnel selecting device, a personnel selecting system, a personnel selecting method, and a recording medium.

2. Description of the Related Art

A system has been studied which matches requested services such as labor to personnel who perform the services. For example, Japanese Unexamined Patent Application Publication No. 2016-48488 discloses a work management device which outputs the skill level of a worker relative to a combination of work details and a work target. The skill level is obtained based on the performance points calculated based on work performance which includes the work details and the work target.

SUMMARY

In the technique disclosed in Japanese Unexamined Patent Application Publication No. 2016-48488, the presented work skill of each worker is based on the performance points added according to the performance of the work details and the work target. The evaluation made by the client for the work is not reflected in the work skill. Hence, there is a possibility that the personnel requested by the client for services such as labor do not match the personnel provided by a provider.

The present disclosure provides a personnel selecting device, a personnel selecting system, a personnel selecting method, and a recording medium which improve the degree of matching personnel to be selected to the service request made by the client.

A personnel selecting device according to one aspect of the present disclosure includes: a personnel extracting unit which (i) obtains information of a requested service from a client device, (ii) extracts personnel matched to the information of the requested service by referring to a storage which stores information indicating a correspondence relationship between a service and personnel, and (iii) outputs, to the client device, information of the personnel extracted; a personnel arranging unit which (i) obtains, from the client device, information of personnel selected from among the personnel extracted, and (ii) requests the requested service of the personnel selected; and an analyzing unit which (i) obtains, from the client device, information indicating evaluation details for the requested service performed, the evaluation details being in natural language, (ii) determines an evaluation for the evaluation details by analyzing a character string indicated by the evaluation details, and (iii) updates the information in the storage based on the evaluation determined.

A personnel selecting system according to one aspect of the present disclosure includes: the personnel selecting device according to one aspect of the present disclosure; the client device which outputs, to the personnel selecting device, the information of the requested service, the information of the personnel selected, and the information indicating the evaluation details; and a service provider device which includes the storage and an updating unit which updates the information in the storage based on the evaluation for the evaluation details determined by the personnel selecting device.

A personnel selecting method according to one aspect of the present disclosure includes: obtaining information of a requested service from a client; extracting personnel matched to the information of the requested service by referring to information indicating a correspondence relationship between a service and personnel; outputting information of the personnel extracted to the client; obtaining, from the client, information of personnel selected from among the personnel extracted; requesting the requested service of the personnel selected; obtaining, from the client, information indicating evaluation details for the requested service performed, the evaluation details being in natural language; determining an evaluation for the evaluation details by analyzing a character string indicated by the evaluation details; and updating the information indicating the correspondence relationship between the service and the personnel based on the evaluation determined.

A recording medium according to one aspect of the present disclosure is a non-transitory computer-readable recording medium for use in a computer. The recording medium having a computer program recorded thereon causes the computer to execute: obtaining information of a requested service from a client device; extracting personnel matched to the information of the requested service by referring to information indicating a correspondence relationship between a service and personnel; outputting information of the personnel extracted to the client device; obtaining, from the client device, information of personnel selected from among the personnel extracted; requesting the requested service of the personnel selected; obtaining, from the client device, information indicating evaluation details for the requested service performed, the evaluation details being in natural language; determining an evaluation for the evaluation details by analyzing a character string indicated by the evaluation details; and updating the information indicating the correspondence relationship between the service and the personnel based on the evaluation determined.

General and specific aspects disclosed above may be implemented using a system, a device, a method, an integrated circuit, a computer program, or a computer-readable recording medium such as a recording disk, or any combination of systems, devices, methods, integrated circuits, computer programs, or recording media. Examples of the computer-readable recording medium include a non-volatile recording medium such as a compact disc-read only memory (CD-ROM).

According to the personnel selecting device and the like according to the present disclosure, it is possible to improve the degree of matching personnel to be selected to a service request made by the client.

BRIEF DESCRIPTION OF DRAWINGS

These and other objects, advantages and features of the disclosure will become apparent from the following descrip

FIG. 3 illustrates an example of an image which presents personnel candidate information and which is displayed by a candidate presenting unit according to Embodiment 1;

FIG. 4 illustrates an example of an image which requests selection from personnel candidates and which is displayed by a personnel selecting unit according to Embodiment 1;

FIG. 6 illustrates an example of personnel information of one person recorded in a service performance status DB according to Embodiment 1;

FIG. 7 illustrates an example of personnel information of one person stored in an available time information storage according to Embodiment 1;

FIG. 8 illustrates an example of service information similar to various services recorded in a similar service reference DB according to Embodiment 1;

FIG. 9 illustrates an example of information of various evaluation keywords and evaluation indexes recorded in an evaluation KW reference DB according to Embodiment 1;

DETAILED DESCRIPTION OF THE EMBODIMENTS

Figure 1:
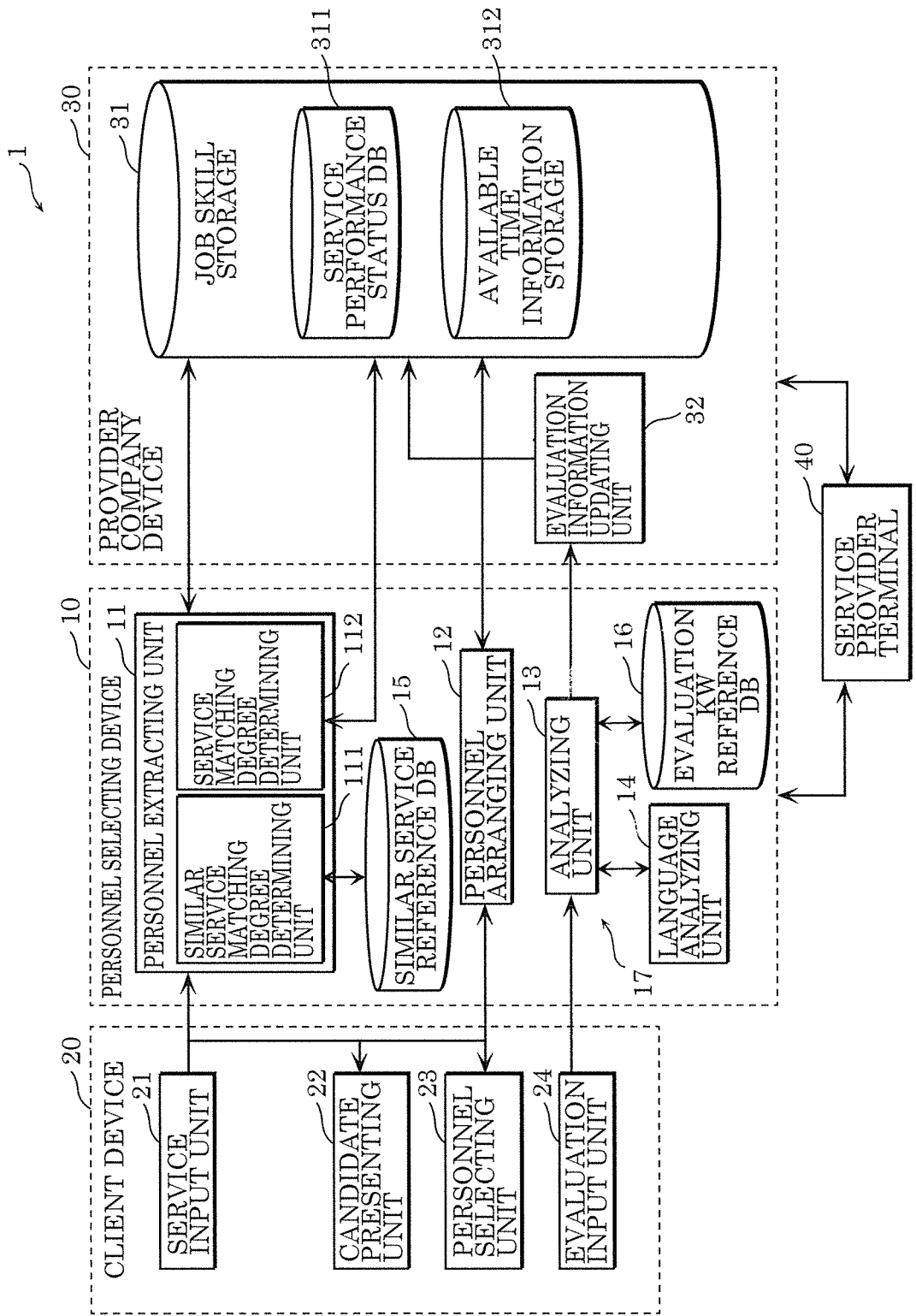
- FIG. 1 is a block diagram illustrating an example of a functional configuration of a personnel selecting system including a personnel selecting device according to Embodiment 1.

An increase in the number of elderly people is expected to lead to more diversity and an increase in outsourced work and services including various daily life related matters. In other words, requests for services such as labor are expected to increase in both amount and diversity. Moreover, there is a demand for selecting personnel matched to the requests for such various services and providing the selected personnel to the client. The inventor of the present disclosure has studied a technique for personnel selection not only being matched to the requested services but also reflecting evaluations made by the client. For example, the technique disclosed in Japanese Unexamined Patent Application Publication No. 2016-48488 is capable of providing personnel with work skills matched to the requested services, but the client evaluation is not reflected. In view of the above, the inventor of the present disclosure has created a personnel selecting technique which reflects the requests from the client more by combining the client evaluation into the personnel information.

For example, a personnel selecting device according to one aspect of the present disclosure includes: a personnel extracting unit which (i) obtains information of a requested service from a client device, (ii) extracts personnel matched to the information of the requested service by referring to a storage which stores information indicating a correspondence relationship between a service and personnel, and (iii) outputs, to the client device, information of the personnel extracted; a personnel arranging unit which (i) obtains, from the client device, information of personnel selected from among the personnel extracted, and (ii) requests the requested service of the personnel selected; and an analyzing unit which (i) obtains, from the client device, information indicating evaluation details for the requested service performed, the evaluation details being in natural language, (ii) determines an evaluation for the evaluation details by analyzing a character string indicated by the evaluation details, and (iii) updates the information in the storage based on the evaluation determined.

According to the above aspect, the evaluation details for the performed services obtained from the client device can be reflected in information which indicates a correspondence relationship between service and personnel used for extraction of personnel for requested services. Accordingly, it is possible to select personnel with an improved degree of matching to the client request. Moreover, the evaluation details output from the client device is generated by using natural language. Accordingly, it is possible to obtain the evaluation details freely generated. Such evaluation details are not restricted or biased ones such as evaluation items prepared in advance by the service provider company, but the ones which can reflect the intention of the client faithfully. Hence, the updated correspondence relationship between service and personnel is capable of reflecting the client's intention more faithfully. Accordingly, the personnel selecting device is capable of improving the degree of matching personnel to be selected to a service request made by the client.

The personnel selecting device according to one aspect of the present disclosure may further include a similar service storage which stores information of a service similar to a given service. The personnel extracting unit may (i) extract a similar service similar to the requested service obtained from the client device by referring to the similar service storage, and (ii) extract personnel matched to one of the requested service and the similar service by referring to the storage.

According to the above aspect, personnel matched to the requested services or similar services are extracted. With this, since matched personnel are extracted from among a larger number of personnel, the degree of matching personnel to be selected to the service request made by the client is improved.

In the personnel selecting device according to one aspect of the present disclosure, it may be that the storage stores an evaluation for each service performed by each personnel, and the personnel extracting unit extracts personnel based on the evaluation for each service performed by each personnel.

According to the above aspect, an evaluation for each service is set for each personnel. Hence, in the extraction of personnel matched to the requested service information, personnel are extracted based on the evaluations corresponding to the requested services. This facilitates the processing for extracting personnel, and improves the degree of matching personnel to be extracted to the requested services.

It may be that the personnel selecting device according to one aspect of the present disclosure further includes an evaluation information storage which stores an evaluation keyword and an evaluation corresponding to the evaluation keyword, and that the analyzing unit (i) divides the character string indicated by the evaluation details into a plurality of character strings, (ii) determines the evaluation keyword corresponding to each of the plurality of character strings divided by referring to the evaluation information storage, and (iii) determines an evaluation for the evaluation details based on the evaluation corresponding to the evaluation keyword determined.

According to the above aspect, an evaluation is obtained which corresponds to each character string obtained by dividing the character string indicating the evaluation details. Accordingly, in the case where a character string which indicates the evaluation details includes a plurality of character strings such as words indicating evaluations, it is possible to determine an evaluation for the evaluation details which reflects the evaluation indicated by each character string. Hence, the accuracy of the evaluation for the evaluation details is improved.

In the personnel selecting device according to one aspect of the present disclosure, it may be that the storage stores a personal characteristic of each personnel, that the information of the requested service includes the requested service and a desirable personal characteristic, and that the personnel extracting unit extracts personnel matched to the requested service and the desirable personal characteristic by referring to the storage.

According to the above aspect, even in a case where a client requests not only services to be performed but also personal characteristics such as the personality traits of the person who performs the services, it is possible to select personnel matched to the client request. Hence, it is possible to select appropriate personnel in response to the client request.

In the personnel selecting device according to one aspect of the present disclosure, it may be that the storage stores a personal characteristic of each personnel, and that the personnel extracting unit outputs the information of the personnel extracted to the client device, the information including the personal characteristic of the personnel.

According to the above aspect, in the case where the client requests not only the services to be performed, but also personal characteristics such as the personality traits of the person who performs the services, the client is capable of selecting personnel satisfying the above requests by referring to the extracted personnel information.

In the personnel selecting device according to one aspect of the present disclosure, it may be that the storage stores, for each personnel, information indicating a time at which the personnel is capable of performing a service, and that the personnel extracting unit outputs the information of the personnel extracted to the client device, the information including the information indicating the time at which the personnel is capable of performing the service.

According to the above aspect, the client is capable of selecting personnel matched to the time at which the client requests the services by referring to the extracted personnel information.

A personnel selecting system according to one aspect of the present disclosure includes: the personnel selecting device according to one aspect of the present disclosure; the client device which outputs, to the personnel selecting device, the information of the requested service, the information of the personnel selected, and the information indicating the evaluation details; and a service provider device which includes the storage and an updating unit which updates the information in the storage based on the evaluation for the evaluation details determined by the personnel selecting device. According to the above aspect, the advantageous effects similar to those of the personnel selecting device according to one aspect of the present disclosure can be obtained.

A personnel selecting method according to one aspect of the present disclosure includes: obtaining information of a requested service from a client; extracting personnel matched to the information of the requested service by referring to information indicating a correspondence relationship between a service and personnel; outputting information of the personnel extracted to the client; obtaining, from the client, information of personnel selected from among the personnel extracted; requesting the requested service of the personnel selected; obtaining, from the client, information indicating evaluation details for the requested service performed, the evaluation details being in natural language; determining an evaluation for the evaluation details by analyzing a character string indicated by the evaluation details; and updating the information indicating the correspondence relationship between the service and the personnel based on the evaluation determined. According to the above aspect, the advantageous effects similar to those of the personnel selecting device according to one aspect of the present disclosure can be obtained.

A recording medium according to one aspect of the present disclosure is a non-transitory computer-readable recording medium for use in a computer. The recording medium having a computer program recorded thereon causes the computer to execute: obtaining information of a requested service from a client device; extracting personnel matched to the information of the requested service by referring to information indicating a correspondence relationship between a service and personnel; outputting information of the personnel extracted to the client device; obtaining, from the client device, information of personnel selected from among the personnel extracted; requesting the requested service of the personnel selected; obtaining, from the client device, information indicating evaluation details for the requested service performed, the evaluation details being in natural language; determining an evaluation for the evaluation details by analyzing a character string indicated by the evaluation details; and updating the information indicating the correspondence relationship between the service and the personnel based on the evaluation determined. According to the above aspect, the advantageous effects similar to those of the personnel selecting device according to one aspect of the present disclosure can be obtained.

General and specific aspects described above may be implemented using a system, a device, a method, an integrated circuit, a computer program, or a computer-readable recording medium such as a recording disk, or any combination of systems, devices, methods, integrated circuits, computer programs, or recording media. Examples of the computer-readable recording medium include a non-volatile recording medium such as CD-ROM. Moreover, a device may include one or more devices. In the case where a device includes two or more devices, the two or more devices may be disposed in one apparatus, or may be disposed separately in two or more apparatuses. In the present description and claims, the term "device" can mean not only one device, but also a system including a plurality of devices.

Hereinafter, a personnel selecting device and the like according to the present disclosure will be specifically described with reference to the drawings. The embodiments described below each indicate a general or specific example.

The numerical values, shapes, structural components, the arrangement and connection of the structural components, the steps, the processing order of the steps etc., indicated in the following embodiments are mere examples, and therefore do not intend to limit the present disclosure. Among the structural components in the following embodiments, those not recited in any of the independent claims defining the most generic part are described as optional structural components. Note that the drawings are represented schematically and are not necessarily precise illustrations. Additionally, like reference signs indicate substantially the same structural components in the drawings, and overlapping descriptions thereof are omitted or simplified.

Embodiment 1

[1-1. Personnel Selecting System]

With reference to FIG. 1, personnel selecting system 1, which includes personnel selecting device 10, and personnel selecting device 10 according to Embodiment 1 will be described. FIG. 1 is a block diagram illustrating an example of a functional configuration of personnel selecting system 1 including personnel selecting device 10 according to Embodiment 1. Personnel selecting system 1 according to Embodiment 1 receives a request for services such as labor from a client, extracts personnel matched to the request from among registered personnel, and provides the extracted personnel to the client. Personnel selecting system 1 includes client device 20 used so that the client receives provision of services, provider company device 30 which is provided at a provider company and stores information of registered personnel, and personnel selecting device 10. Personnel selecting device 10 serves as a mediator between the service client and the provider company which provides the services.

Client device 20 is provided at the service client, and includes a display which displays an image and an input and output device. Client device 20 may include a loudspeaker which outputs sound, and may include a microphone which obtains sound signals. Client device 20 transmits and receives information to and from personnel selecting device 10 via a wired communication or a wireless communication. Examples of client device 20 include a mobile terminal such as a mobile phone, a smart phone or a tablet, and a computer device such as a personal computer. Examples of the display include a liquid crystal display (LCD), and an organic or an inorganic electroluminescent (EL) display:

In the present embodiment, personnel selecting device 10 is provided at a place different from client device 20 and provider company device 30. Personnel selecting device 10 transmits and receives information to and from client device 20 and provider company device 30 via a wired communication or a wireless communication. Moreover, personnel selecting device 10 transmits and receives, via a wired communication or a wireless communication, information to and from service provider terminal 40 of a person who is registered at the provider company and who actually provides the services. Examples of personnel selecting device 10 include a computer device such as a personal computer or a server device. Personnel selecting device 10 may be provided at the provider company together with provider company device 30.

Provider company device 30 is provided at the provider company. Provider company device 30 transmits and receives information to and from personnel selecting device 10 and service provider terminal 40 via a wired communication or a wireless communication. Examples of provider company device 30 include a computer device such as a personal computer or a server device. Provider company device 30 is an example of a service provider device.

Service provider terminal 40 is provided at the service provider who is registered at the provider company and who is a person who performs the services. The service provider performs the services, in response to the service request from the provider company. Examples of service provider terminal 40 include a mobile terminal such as a mobile phone, a smart phone or a tablet, and a computer device such as a personal computer.

Examples of the communication between personnel selecting device 10, client device 20, provider company device 30, and service provider terminal 40 include a communication via a communication network such as the Internet, a communication in accordance with a mobile communication standard, and a communication via other wireless or wired network. The details of personnel selecting device 10, client device 20, and provider company device 30 will be described below.

[1-2. Client Device]

The details of client device 20 will be described with reference to FIG. 1. Client device 20 includes service input unit 21, candidate presenting unit 22, personnel selecting unit 23, and evaluation input unit 24.

Service input unit 21 turns client device 20 into the state where input of a requested service can be received from a client. Specifically, service input unit 21 displays, on display 20a of client device 20, information prompting input of requested services. Service input unit 21 may indicate the information by sound together with the display of display 20a or instead of the display of display 20a. Additionally, service input unit 21 receives the service input via an input device. Examples of the input device include a touch panel, a keypad, and a microphone. In the present embodiment, the input device is a touch panel. The touch panel includes display 20a, and is capable of displaying information and receiving an input. When the input device is a microphone, at least one of client device 20 and personnel selecting device 10 may include a speech recognition device which extracts character strings from sound signals input via the microphone.

Figure 2A:
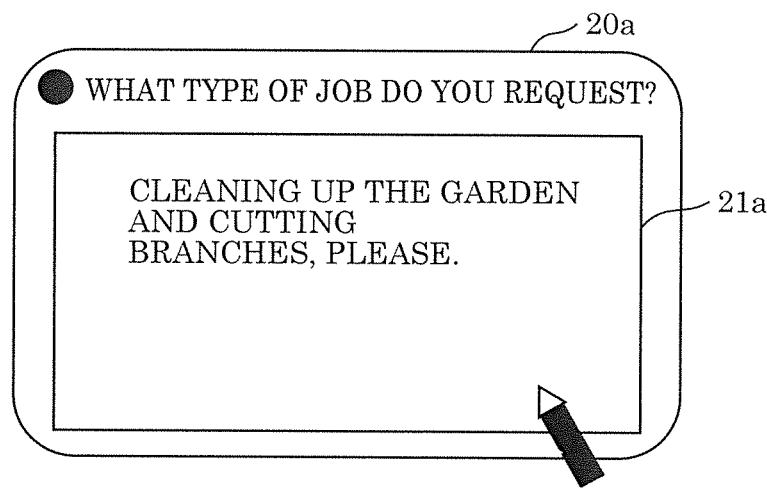
FIG. 2A illustrates an example of an image which requests input of services and which is displayed by a client device according to Embodiment 1.

For example, as illustrated in FIG. 2A, service input unit 21 displays, on display 20a of client device 20, first request image 21a that is an image indicating information requesting input of services. The client inputs requested services to display 20a. FIG. 2A illustrates an example of an image which requests input of services and which is displayed by client device 20 according to Embodiment 1. Although the example in FIG. 2A illustrates a free input format in which the requested services are freely input to display 20a, the service input format may be any format. For example, the service input format may be a selective input format in which requested services are selected from among a plurality of displayed services or a menu input format in which requested services are narrowed down according to the display of the menu screen.

Figure 2B:
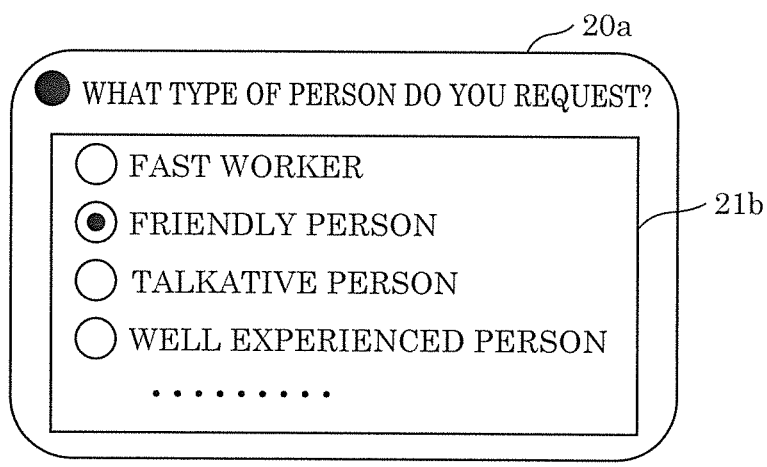
FIG. 2B illustrates an example of an image which requests input of desirable personnel information and which is displayed by the client device according to Embodiment 1.

As illustrated in FIG. 2B, after the services are input, service input unit 21 displays, on display 20a, second request image 21b that is an image which indicates information requesting input of requests for personnel who perform the services. The client inputs desirable personnel information to display 20a. FIG. 2B illustrates an example of an image which requests input of desirable personnel information and which is displayed by client device 20 according to Embodiment 1. Although the example of FIG. 2B illustrates a selective input format in which desirable characteristics are selected from among a plurality of displayed personnel characteristics, the input format may be any other format such as a free input format or a menu input format. Moreover, although the example of FIG. 2B illustrates the characteristics of the personnel himself/herself, the characteristics may be any characteristics. For example, the characteristics may include information related to personnel address, personnel evaluation information, or personnel available time information.

Service input unit 21 transmits, to personnel extracting unit 11 of personnel selecting device 10, information input by the client at the time of display of FIG. 2A, FIG. 2B or the like.

Candidate presenting unit 22 receives, from personnel extracting unit of personnel selecting device 10, personnel candidate information corresponding to the information input from the client via service input unit 21, and displays the personnel candidate information on display 20a of client device 20. Candidate presenting unit 22 may indicate the information by sound together with the display of display 20a or instead of the display of display 20a. The personnel candidates are extracted by personnel extracting unit 11 to be described later. For example, as illustrated in FIG. 3, candidate presenting unit 22 displays, on display 20a, candidate image 22a indicating personnel candidate information. Candidate image 22a includes information related to the personnel candidates, in addition to the names of the personnel candidates. Examples of the personnel related information include addresses, service available times and dates, that is, available days, and personnel characteristics. The personnel characteristics may be overall characteristics of the personnel, and may be characteristics of the personnel related to the services requested by the client. FIG. 3 illustrates an example of an image which presents personnel candidate information displayed by candidate presenting unit 22 according to Embodiment 1.

After candidate presenting unit 22 presents personnel candidates, personnel selecting unit 23 turns client device 20 into the state where selection of the personnel is received from the client. Specifically, personnel selecting unit 23 displays, on display 20a of client device 20, information prompting input of personnel selection from among the personnel candidates. Personnel selecting unit 23 may indicate the information by sound together with the display of display 20a or instead of the display of display 20a. Additionally, personnel selecting unit 23 receives input of the selection via an input device. Input of the personnel selection from among the personnel candidates may include input indicating selected personnel, and input indicating that no personnel is selected. For example, the above input may be input which indicates selection or non-selection for each personnel. For example, as illustrated in FIG. 4, personnel selecting unit 23 displays, on display 20a, selection request image 23a which requests personnel selection from among a plurality of personnel candidates. FIG. 4 illustrates an example of an image which requests selection from among personnel candidates displayed by personnel selecting unit 23 according to Embodiment 1. For example, the input format of personnel selection may be a selective input format in which desirable personnel is selected from among a plurality of displayed personnel. Personnel selecting unit 23 may obtain input of the selection by sound together with the display of display 20a or instead of the display of display 20a.

Figure 5A:
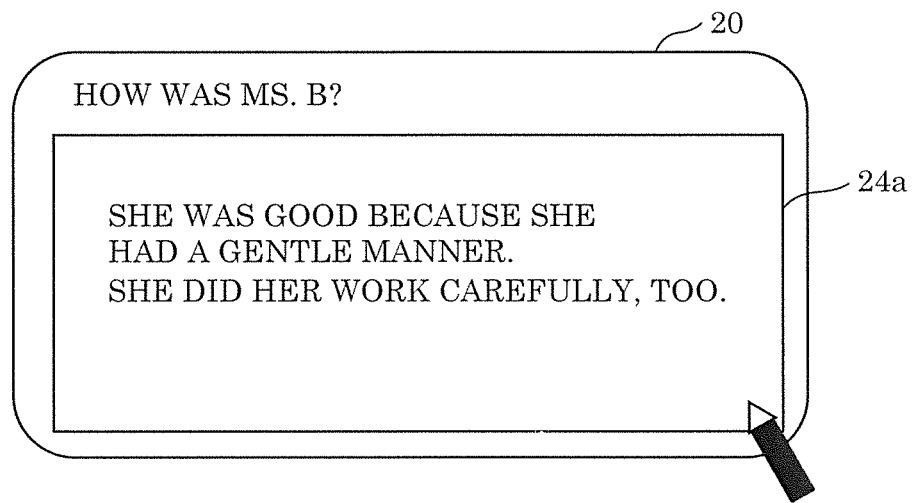
FIG. 5A illustrates an example of an image which requests input of evaluation and which is displayed by an evaluation input unit according to Embodiment 1.
Figure 5B:
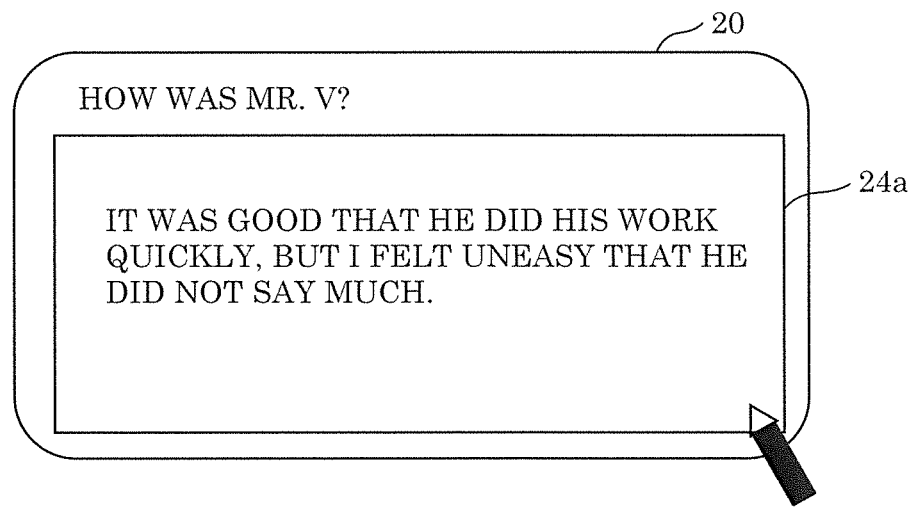
FIG. 5B illustrates an example of an image which requests input of evaluation and which is displayed by the evaluation input unit according to Embodiment 1.

Evaluation input unit 24 turns client device 20 into the state where personnel evaluation can be received from the client. Specifically, evaluation input unit 24 displays, on display 20a of client device 20, information which prompts input of an evaluation for the personnel who performed the services. Additionally, evaluation input unit 24 receives input of the evaluation via an input device. For example, as illustrated in FIG. 5A and FIG. 5B, evaluation input unit 24 displays, on display 20a of client device 20, evaluation request image 24a which requests input of personnel evaluation. FIG. 5A and FIG. 5B each illustrate an example of an image which requests input of an evaluation and which is displayed by evaluation input unit 24 according to Embodiment 1.

The client inputs evaluation details in natural language by using an input device, such as a touch panel or a keypad, of client device 20. Alternatively, the client inputs the evaluation details by sound in natural language, to an input device, such as a microphone, of client device 20. When the input device is a microphone, at least one of client device 20 and personnel selecting device 10 may include a speech recognition device which extracts character strings from sound signals input via the microphone. Regarding the evaluation details in natural language, expressions to be input such as a keyword, a fixed term, and a template are not predetermined, and the client is capable of inputting the evaluation details in his or her own language using free expressions.

The respective structural components of client device 20 which are service input unit 21, candidate presenting unit 22, personnel selecting unit 23, and evaluation input unit 24 may be configured from a computer system (not illustrated) including a processor such as a central processing unit (CPU) or a digital signal processor (DSP), and a memory such as a random access memory (RAM) and a read-only memory (ROM). Part or all of the functions of each structural component may be achieved by the CPU or the DSP executing a program stored in the ROM while using the RAM as a work memory. Moreover, part or all of the functions of each structural component may be achieved by a dedicated hardware circuit such as an electric circuit or an integrated circuit. Part or all of the functions of each structural component may be configured from a combination of the above software function and hardware circuit. Each structural component may be achieved by a program for executing the functions of the structural component being installed in client device 20. The program may be provided via a recording medium, or may be provided as an application by, for example, a communication via a communication network such as the Internet, a communication in accordance with a mobile communication standard, other wireless network, wired network or broadcasting.

[1-3. Provider Company Device]

Details of provider company device 30 will be described with reference to FIG. 1. Provider company device 30 includes job skill storage 31, and evaluation information updating unit 32.

Job skill storage 31 stores information of each personnel who is registered at the provider company and who perform services. Job skill storage 31 allows information to be stored and read, and is realized by a semiconductor memory such as a ROM, a RAM, or a flash memory, a hard disk drive, or a storage device such as a solid state drive (SSD). The information stored in job skill storage 31 includes, for each personnel, services which can be performed by the personnel, personal characteristics, an evaluation value for each evaluation item, and the like. Specifically, job skill storage 31 includes service performance status database (hereinafter, also referred to as "DB") 311, and available time information storage 312. Job skill storage 31 is an example of a storage.

Service performance status DB 311 records, for each registered personnel, services which can be performed by the personnel, personal characteristics, and an evaluation value for each evaluation item. For example, as illustrated in FIG. 6, service performance status DB 311 records, for each personnel, service performed that corresponds to the service which can be performed by the personnel, an evaluation value for each service performed, and personal characteristics. FIG. 6 illustrates an example of personnel information of one person recorded in service performance status DB 311 according to Embodiment 1.

Available time information storage 312 stores and accumulates, for each personnel registered in job skill storage 31, service available time information which is information including service available time that is a time at which a service can be newly performed. Specifically, available time information storage 312 stores the address of each personnel in association with the service available time. Moreover, available time information storage 312 stores the location at which the services can be performed in association with the service available time at the location. Moreover, available time information storage 312 stores at least one service available time for each location at which the services can be performed. When two or more service available times are set for one location, available time information storage 312 may sequentially store the service available times from the earliest time. For example, as illustrated in FIG. 7, available time information storage 312 stores, for each personnel, the address, the destination which is the location at which services can be performed, and the service available time at each destination. Moreover, available time information storage 312 stores two or more service available times at each destination in a sequential order. FIG. 7 illustrates an example of personnel information of one person stored in available time information storage 312 according to Embodiment 1.

The service available time information in available time information storage 312 is updated based on an input from the person registered in job skill storage 31. For example, the registered person may change the service available time information in available time information storage 312 by directly accessing job skill storage 31 via service provider terminal 40 of the registered person. Alternatively, it may be that the registered person accesses the service provider company via service provider terminal 40 of the registered person or another communication device, and that an operator or the like of the service provider company changes the service available time information in available time information storage 312. In other words, the registered person may indirectly change the service available time information.

Evaluation information updating unit 32 obtains the analysis result of the client evaluation for the services from analyzing unit 13 of personnel selecting device 10 to be described later. Evaluation information updating unit 32 refers to the personnel information corresponding to the obtained analysis result in service performance status DB 311 of job skill storage 31. Evaluation information updating unit 32 updates, by using the evaluation values for the services indicated by the analysis result, the evaluation values for the services performed by the personnel in service performance status DB 311. Evaluation information updating unit 32 may have configuration which is similar to the configuration of as any one of the structural components of client device 20 described above. Evaluation information updating unit 32 is an example of an updating unit.

[1-4. Personnel Selecting Device]

Details of personnel selecting device 10 will be described with reference to FIG. 1. Personnel selecting device 10 includes personnel extracting unit 11, personnel arranging unit 12, analyzing unit 13, language analyzing unit 14, similar service reference database (hereinafter, may also be referred to as "DB") 15, and evaluation keyword reference database (hereinafter, may be referred to as "evaluation KW reference DB") 16. Analyzing unit 13 and language analyzing unit 14 form analyzing unit 17. Personnel extracting unit 11 includes similar service matching degree determining unit 111 and service matching degree determining unit 112. Each of personnel extracting unit 11, personnel arranging unit 12, analyzing unit 13, and language analyzing unit 14 may have configuration which is similar to the configuration of as any one of the structural components of client device 20 described above. Similar service reference DB 15 and evaluation KW reference DB 16 are stored in a storage device such as job skill storage 31 illustrated as an example, and the storage device is included in personnel selecting device 10.

Similar service reference DB 15 records, for each of various services, services similar to the service. For example, as illustrated in FIG. 8, similar service reference DB 15 records similar services which are services similar to each of input services which are various services. The similar services may include services with similar content and/or services with a common keyword used for service evaluation. The services with similar content may include similar types of services, and other services which can be performed by personnel who can perform a given service. The data in similar service reference DB 15 may be generated and stored by a company which handles personnel selecting device 10, and may be updated by personnel selecting device 10 based on the evaluation keywords included in the client evaluation for the services. FIG. 8 illustrates an example of information of services similar to various services recorded in similar service reference DB 15 according to Embodiment 1. Similar service reference DB 15 is an example of a similar service storage.

Personnel extracting unit 11 receives, from service input unit 21 of client device 20, requested service information including requested services and desirable personnel input by the client. Personnel extracting unit 11 refers to job skill storage 31 of provider company device 30 based on the requested service information, and searches information of each registered personnel who perform the services. Personnel extracting unit 11 extracts personnel candidates matched to the requested service information, and transmits the extracted personnel candidates to candidate presenting unit 22 of client device 20.

Similar service matching degree determining unit 111 extracts similar services which are similar to the services included in the requested service information, by using similar service reference DB 15. Similar service matching degree determining unit 111 generates requested service extended information by adding extracted similar services to the requested service information. The requested service extended information includes requested services input by the client and the services similar to the requested services.

Service matching degree determining unit 112 refers to service performance status DB 311 of job skill storage 31, and determines the degree of matching between respective personnel information included in service performance status DB 311 and the requested service extended information. For example, service matching degree determining unit 112 extracts, from service performance status DB 311, personnel having evaluation values greater than or equal to a threshold relative to any one of the requested services and the similar services in the requested service extended information. Moreover, service matching degree determining unit 112 extracts, from the extracted personnel, personnel having personal characteristics included in the desirable personnel information in the requested service extended information, as the personnel candidates. For example, service matching degree determining unit 112 may calculate, for information of each personnel, the matching degree to the requested service extended information by using the total evaluation values for the requested services or similar services and the quantity of personal characteristics matched to the personal characteristics included in the desirable personnel information. Service matching degree determining unit 112 may then extract personnel having matching degrees greater than or equal to a matching threshold value, as personnel candidates.

Moreover, service matching degree determining unit 112 refers to available time information storage 312 to read the addresses and the earliest available times of the extracted personnel candidates. Service matching degree determining unit 112 transmits, to candidate presenting unit 22 of client device 20, the personnel candidates, the addresses and the available times of the personnel candidates. Service matching degree determining unit 112 may use a time threshold set for the available times to exclude, from the personnel candidates, personnel with available times later or equal to the time threshold. Moreover, when the requested service extended information indicates the location, specified by the client, at which the services are to be performed, service matching degree determining unit 112 may exclude, from the personnel candidates, personnel with addresses too far away from the specified location by a predetermined distance or more. In this way, service matching degree determining unit 112 extracts personnel candidates by using the matching degree with requested services or similar services, personal characteristics, service available time, and/or addresses of personnel.

Personnel arranging unit 12 receives, from personnel selecting unit 23 of client device 20, information of the personnel selected by the client from among the personnel candidates. Personnel arranging unit 12 transmits, to service provider terminal 40 of the selected personnel, information requesting services to be performed.

Evaluation KW reference DB 16 records various evaluation keywords related to evaluations and evaluation indexes corresponding to respective keywords in association with each other. The evaluation indexes include, for example, evaluation values (also referred to as evaluation scores), and additive and subtractive values relative to the evaluation values. The evaluation values each may be indicated by a positive evaluation value or a negative evaluation value. For example, as illustrated in FIG. 9, evaluation KW reference DB 16 records, for each of various evaluation keywords, an evaluation score corresponding to the evaluation keyword, an increased rate for the evaluation score, or a decrease rate for the evaluation score, as an evaluation index. Note that FIG. 9 illustrates an example of information of various evaluation keywords and evaluation indexes recorded in evaluation KW reference DB 16 according to Embodiment 1. Here, evaluation KW reference DB 16 is an example of an evaluation information storage.

Language analyzing unit 14 receives the evaluation, input by the client, for the person who performed the services, from evaluation input unit 24 of client device 20 via analyzing unit 13. The evaluation is information indicated by a character string in natural language. Specifically, language analyzing unit 14 divides the character string in natural language into character strings of words, phrases, or the like, and estimates evaluation keywords matched to the divided character strings or evaluation keywords with meaning close to the divided character strings from the evaluation keywords in evaluation KW reference DB 16. In the estimation above, for example, it may be that language analyzing unit 14 estimates the sensation polarity of the divided character strings, and estimates evaluations indicated by the divided character strings based on the estimated sensation polarity. Language analyzing unit 14 may estimate evaluation keywords with meaning close to the divided character strings based on the estimated evaluations. The method of analyzing the character strings which use the sensation polarity and the like is disclosed in Japanese Unexamined Patent Application Publication No. 2010-20390 and Japanese Patent No. 5283288, and is a known technique, and thus, the details description thereof is omitted. Use of artificial intelligence (AI) makes it possible to easily realize language analyzing unit 14 with high precision. In the above described manner, language analyzing unit 14 extracts, from the character string in natural language indicating the evaluation, the evaluation keywords corresponding to a plurality of character strings obtained by dividing the character string.

Analyzing unit 13 calculates evaluation values by using the evaluation keywords extracted by language analyzing unit 14 and evaluation KW reference DB 16, and outputs the calculated evaluation values to evaluation information updating unit 32 of provider company device 30. For example, analyzing unit 13 adds up evaluation values of respective evaluation keywords, that is, sums the evaluation values, and outputs the evaluation value after the addition to evaluation information updating unit 32. Here, analyzing unit 13 increases the evaluation value for the evaluation keyword indicating an increase rate by the increase rate, and decreases the evaluation value for the evaluation keyword indicating a decrease rate by the decrease rate. In this manner, analyzing unit 13 outputs the details of the client evaluation in a quantitative format.

[1-5. Operations of Personnel Selecting System]

Figure 10:
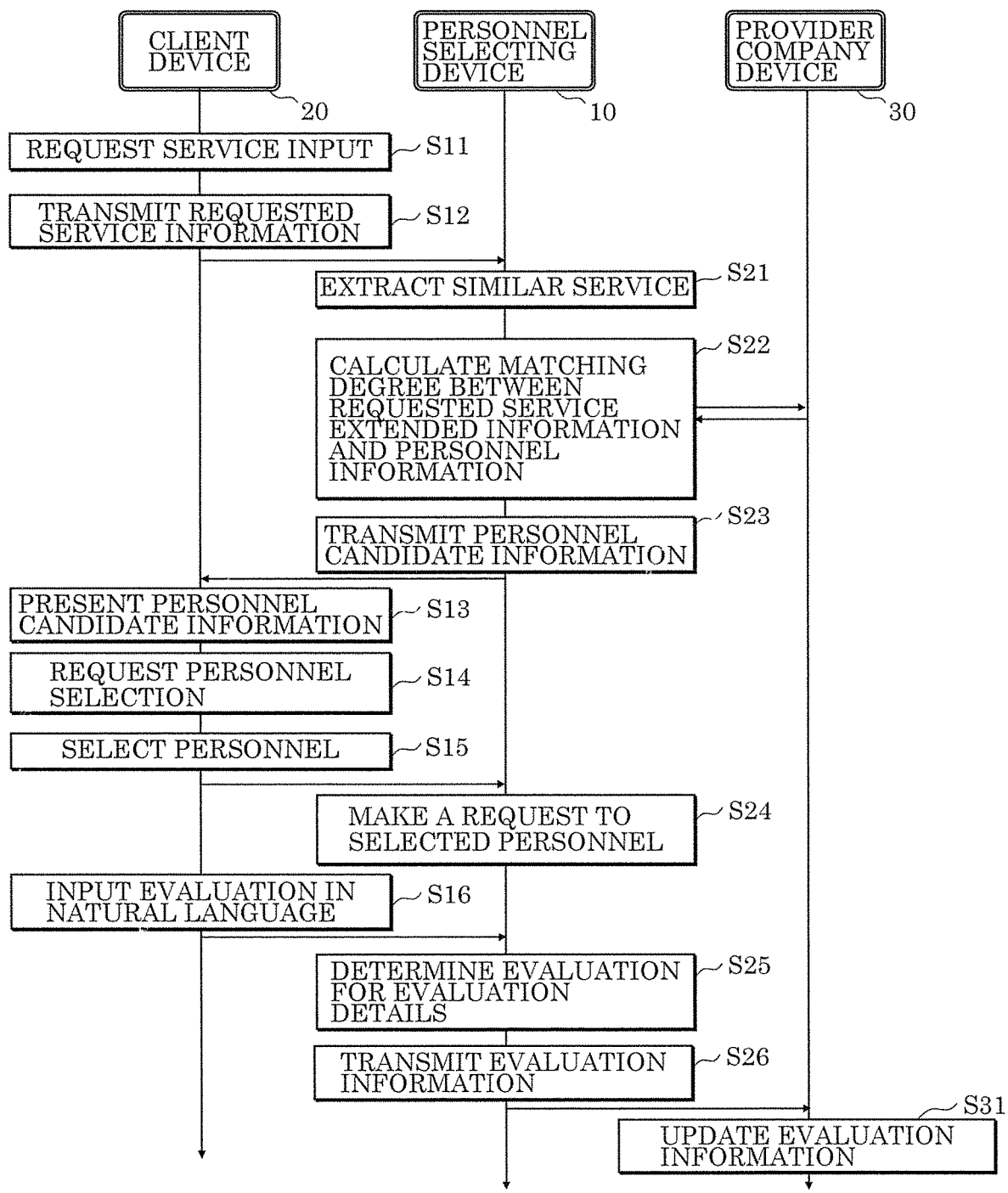
FIG. 10 is a sequence diagram illustrating an example of an operational flow of the personnel selecting system according to Embodiment 1.

Operations of personnel selecting system 1 will be described with reference to FIG. 10. FIG. 10 is a sequence diagram illustrating an example of an operational flow of personnel selecting system 1 according to Embodiment 1. First, in step S11, service input unit 21 of client device 20 displays, on display 20a of client device 20, an image as illustrated in FIG. 2A which requests the client to input the requested services. Moreover, service input unit 21 may display, on display 20a, an image as illustrated in FIG. 2B which requests the client to input desirable personnel. Service input unit 21 may present the above requests by sound.

Subsequently, in step S12, service input unit 21 receives the input of the requested services and the desirable personnel from the client, and transmits the input required services and desirable personnel as requested service information to personnel extracting unit 11 of personnel selecting device 10.

Next, in step S21, similar service matching degree determining unit 111 of personnel extracting unit 11 refers to similar service reference DB 15 based on the received requested service information, and extracts similar services similar to the requested services in the requested service information. Similar service matching degree determining unit 111 generates requested service extended information by adding the similar services to the requested service information.

Next, in step S22, service matching degree determining unit 112 of personnel extracting unit 11 searches for information of personnel registered in job skill storage 31, based on the requested service extended information, and calculates a matching degree which is a determination result of the matching degree of each personnel to the requested services or similar services.

Next, in step S23, personnel extracting unit 11 determines personnel candidate information which is information of personnel with high matching degrees, and transmits the determined information to candidate presenting unit 22 of client device 20.

Next, in step S13, candidate presenting unit 22 presents, to the client via display 20a of client device 20, an image which indicates the received personnel candidate information as illustrated in FIG. 3. Candidate presenting unit 22 may present the personnel candidate information by sound.

Next, in step S14, personnel selecting unit 23 of client device 20 presents, to the client via display 20a, an image which requires selection from among the personnel candidates in the personnel candidate information as illustrated in FIG. 4. Note that personnel selecting unit 23 may perform the presentation by sound.

Next, in step S15, the client selects personnel from among the presented personnel candidates, and makes an input indicating the selected personnel to the image presented by personnel selection unit 23, that is, inputs the personnel selection. Personnel selecting unit 23 transmits the determined personnel information indicating the selected personnel to personnel arranging unit 12 of personnel selecting device 10.

Next, in step S24, personnel arranging unit 12 transmits information which requests services to service provider terminal 40 of the personnel who will perform the services, based on the determined personnel information. In other words, personal arranging unit 12 requests the services of the personnel.

Next, in step S16, after the requested services are performed, the service client inputs, via evaluation input unit 24, evaluation details in natural language according to the images as illustrated in FIG. 5A or FIG. 5B on display 20a. The evaluation details may be input by using a touch panel or another input device, or by sound. Evaluation input unit 24 transmits evaluation information indicating the input evaluation details to analyzing unit 13 of personnel selecting device 10.

Next, in step S25, language analyzing unit 14 of personnel selecting device 10 obtains and analyzes the received evaluation information via analyzing unit 13. Specifically, language analyzing unit 14 analyzes the character string indicating the evaluation details, extracts character strings of words, phrases and the like included in the character string, and associates the extracted character strings with the evaluation keywords in evaluation KW reference DB 16. Analyzing unit 13 refers to evaluation KW reference DB 16, and combines the evaluations of the evaluation keywords corresponding to the extracted character strings. In other words, analyzing unit 13 determines evaluations for the evaluation details.

Next, in step S26, analyzing unit 13 transmits, to evaluation information updating unit 32 of provider company device 30, the combined result as the service evaluation information of the personnel who performed the services. In other words, analyzing unit 13 causes evaluation information updating unit 32 to update the evaluation information.

Next, in step S31, evaluation information updating unit 32 refers to service performance status DB 311 based on the evaluation information, and updates the evaluation information of the services of the personnel corresponding to the evaluation information. In this manner, by using the evaluation from the client, the evaluation information of each service of each personnel is updated, and personnel matched to a newly requested service is selected based on the updated evaluation information.

[1-6. Advantageous Effects]

As described, personnel selecting device 10 according to Embodiment 1 includes personnel extracting unit 11, personnel arranging unit 12, and analyzing unit 17. Personnel extracting unit 11 obtains requested service information from client device 20, extracts personnel matched to the requested service information by referring to job skill storage 31 which stores information indicating a correspondence relationship between services and personnel, and outputs the information of the extracted personnel to client device 20. Personnel arranging unit 12 obtains information of the personnel selected from among the extracted personnel from client device 20, and requests the requested service of the selected personnel. Analyzing unit 17 obtains information indicating evaluation details in natural language for the requested service performed, determines an evaluation for the evaluation details by analyzing the character string indicated by the evaluation details, and updates the information in job skill storage 31 based on the determined evaluation.

With the above configuration, the evaluation details for the services performed obtained from client device 20 can be reflected in information which indicates a correspondence relationship between services and personnel and which is used for extraction of personnel for requested services. Accordingly, it is possible to perform personnel selection with an improved matching degree to the client request. Moreover, the evaluation details output from client device 20 are generated using natural language. Accordingly, it is possible to obtain the evaluation details freely generated. Such evaluation details are not details which are restricted or biased such as evaluation items prepared in advance by the service provider company, but are the details which can reflect the intention of the client faithfully. Hence, it is possible that the updated correspondence relationship between the services and personnel reflects the client's intention more faithfully. Accordingly, personnel selecting device 10 is capable of improving the degree of matching personnel to be selected to the service request made by the client.

Moreover, it may be that personnel selecting device 10 according to Embodiment 1 includes similar service reference DB 15 which stores information of services similar to a given service. It may be that personnel extracting unit 11 extracts similar services similar to the requested services obtained from client device 20 by referring to similar service storage 15, and extracts personnel matched to the requested services or similar services by referring to job skill storage 31. With the above configuration, personnel matched to the requested services or similar services are extracted. Since this allows matched personnel to be extracted from among a larger number of personnel, it is possible to improve the degree of matching personnel to be selected to the service request made by the client.

Moreover, it may be that, in personnel selecting device 10 according to Embodiment 1, job skill storage 31 stores an evaluation for each service performed by each personnel, and personnel extracting unit 11 extracts personnel based on the evaluation for each service performed by each personnel. With the above configuration, the evaluation for each service is set for each personnel. Hence, in the extraction of personnel matched to the requested service information, personnel are extracted based on the evaluations corresponding to the requested services. This facilitates the processing for extracting personnel, and improves the degree of matching the extracted personnel to the requested services.

Moreover, personnel selecting device 10 according to Embodiment 1 includes evaluation KW reference DB 16 which stores evaluation keywords and evaluations corresponding to the evaluation keywords. Analyzing unit 17 may divide the character string indicated by the evaluation details, determine an evaluation keyword corresponding to each of the divided character strings by referring to evaluation KW reference DB 16, and determine an evaluation for the evaluation details based on an evaluation for the determined evaluation keyword. With the above configuration, an evaluation can be obtained which corresponds to each character string obtained by dividing the character string indicating the evaluation details. Accordingly, in the case where a character string which indicates the evaluation details includes a plurality of character strings such as words indicating an evaluation, it is possible to determine an evaluation which corresponds to the evaluation details which reflects the evaluation indicated by each character string. Hence, the accuracy of the evaluation for the evaluation details is improved.

Moreover, in personnel selecting device 10 according to Embodiment 1, job skill storage 31 may store personal characteristics for each personnel. The requested service information may include requested services and desirable personal characteristics. Personnel extracting unit 11 may extract personnel matched to the requested services and desirable personal characteristics by referring to job skill storage 31. With the above configuration, even in a case where a client requests not only the services to be performed, but also personal characteristics such as the personality traits of the person who performs the services, it is possible to select personnel matched to the client request. Hence, it is possible to select appropriate personnel in response to the client request.

Moreover, in personnel selecting device 10 according to Embodiment 1, job skill storage 31 may store personal characteristics for each personnel and personnel extracting unit 11 may output, to client device 20, extracted personnel information including the personal characteristics of the personnel. With the above configuration, in the case where the client requests not only the services to be performed, but also the personal characteristics such as the personality traits of the person who performs the services, the client is capable of selecting personnel which satisfies the above requests by referring to the extracted personnel information.

Moreover, in personnel selecting device 10 according to Embodiment 1, job skill storage 31 may store, for each personnel, information of time at which the services can be performed, and personnel extracting unit 11 may output, to client device 20, extracted personnel information including the time at which the services can be performed. With the above configuration, the client is capable of selecting personnel matched to the time at which the client requests the services by referring to the extracted personnel information.

Moreover, personnel selecting system 1 according to Embodiment 1 includes: personnel selecting device 10 as described above; client device 20 which outputs, to personnel selecting device 10, requested service information, selected personnel information, and information indicating evaluation details; and provider company device 30 including job skill storage 31 and evaluation information updating unit 32 which updates the information in job skill storage 31 based on an evaluation which corresponds to the evaluation details and which is determined by personnel selecting device 10. Personnel selecting system 1 as described is also capable of obtaining the advantageous effects similar to those of personnel selecting device 10.

Embodiment 2

Personnel selecting device 10A according to Embodiment 2 will be described. Personnel selecting device 10A is different from Embodiment 1 in that personnel selecting device 10A has a configuration in which personnel selecting device 10 and provider company device 30 according to Embodiment 1 are integrated. Embodiment 2 will be described below mainly on the differences from Embodiment 1.

Figure 11:
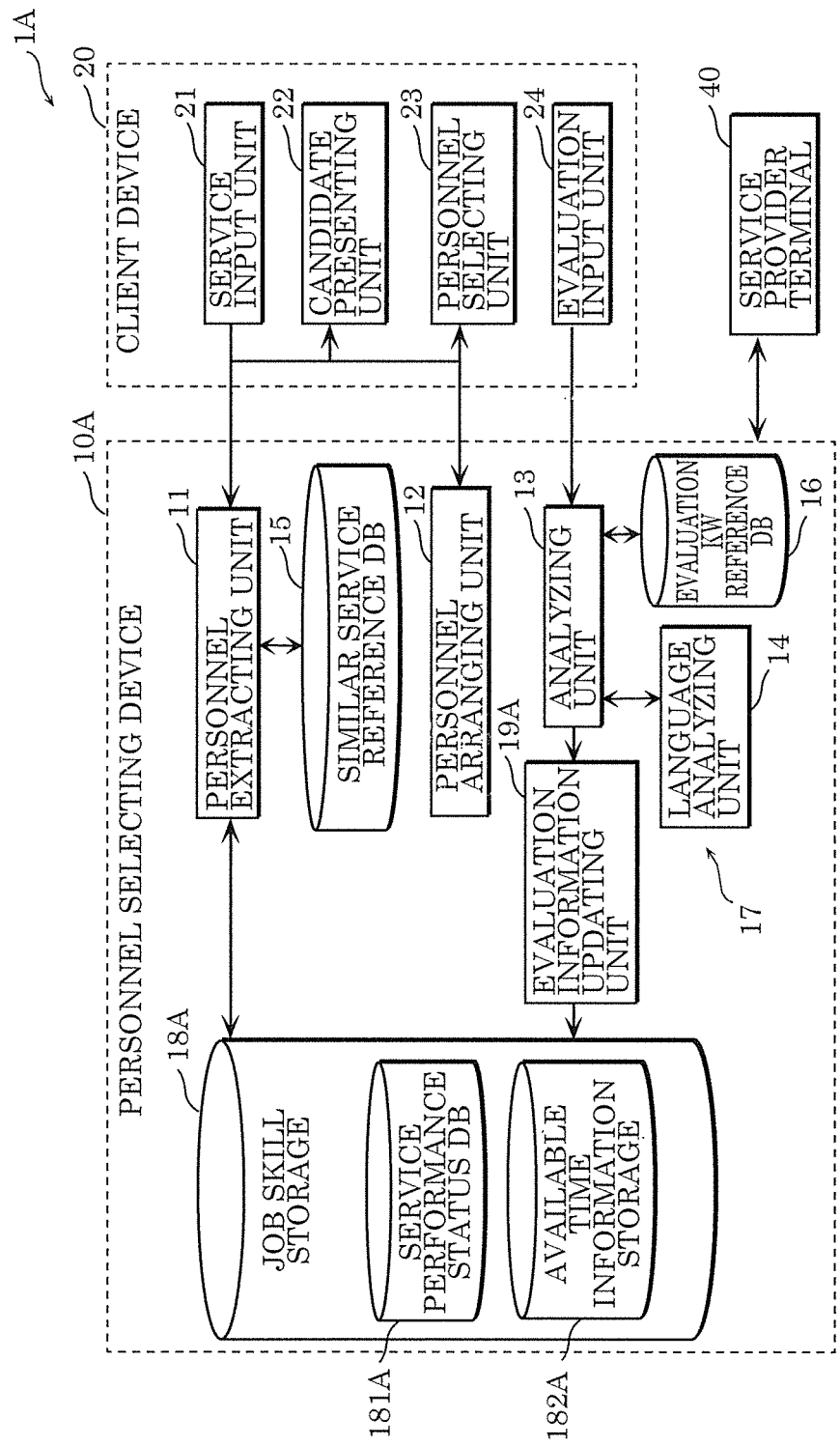
FIG. 11 is a block diagram illustrating an example of a functional configuration of a personnel selecting system including a personnel selecting device according to Embodiment 2.

FIG. 11 is a block diagram illustrating an example of a functional configuration of personnel selecting system 1A including personnel selecting device 10A according to Embodiment 2. As illustrated in FIG. 11, personnel selecting system 1A includes personnel selecting device 10A and client device 20. In a similar manner to Embodiment 1, personnel selecting device 10A includes personnel extracting unit 11, personnel arranging unit 12, analyzing unit 13, language analyzing unit 14, similar service reference DB 15, and evaluation KW reference DB 16. Personnel extracting unit 11 includes similar service matching degree determining unit 111 and service matching degree determining unit 112 which are not illustrated. Moreover, personnel selecting device 10A includes job skill storage 18A and evaluation information updating unit 19A. Job skill storage 18A includes service performance status DB 181A and available time information storage 182A. The configuration and the functions of evaluation information updating unit 19A, job skill storage 18A, service performance status DB 181A, and available time information storage 182A are the same as those in Embodiment 1.

Since the other configuration and operations of personnel selecting device 10A according to Embodiment 2 are similar to Embodiment 1, and thus, the descriptions thereof are omitted. Personnel selecting device 10A according to Embodiment 2 is also capable of obtaining the advantageous effects similar to Embodiment 1. Moreover, personnel selecting device 10A according to Embodiment 2 can be applied when the company which handles personnel selecting device 10A is the same as the service provider company. Personnel selecting device 10A enables a compact configuration in which personnel selecting device 10 and provider company device 30 according to Embodiment 1 are integrated. In contrast, personnel selecting device 10 according to Embodiment 1 can be applied when the company which handles personnel selecting device 10 and the service provider company are different, and one personnel selecting device 10 can be connected to provider company devices 30 of a plurality of service provider companies.

[Others]

Although the personnel selecting devices and the like according to one or more aspects have been described based on the embodiments above, the present disclosure is not limited to such embodiments. Various modifications of the embodiments as well as embodiments resulting from arbitrary combinations of structural components of different embodiments that may be conceived by those skilled in the art are intended to be included within the scope of one or more aspects of the present disclosure as long as these do not depart from the essence of the present disclosure.

For example, in the embodiments described above, personnel extracting unit 11 of the personnel selecting device extracts personnel matched to the requested service information by using the requested services received from client device 20 and similar services similar to the requested services. However, the present disclosure is not limited to such an example. Personnel extracting unit 11 may extract personnel matched to the requested services without using similar services. Alternatively, it may be that personnel extracting unit 11 first refers to the job skill storage to attempt extraction of personnel matched to the requested services, and when personnel matched to the requested services cannot be extracted, personnel extracting unit 11 extracts personnel matched to similar services of the requested services. For example, in extracting personnel matched to the requested services, personnel extracting unit 11 may determine that the personnel is matched to the requested services when the evaluation value of the personnel for the service which is the same as the requested service is greater than or equal to a threshold value, and determine that the personnel is not matched to the requested service when the evaluation value is less than the threshold value.

Moreover, in the embodiments described above, client device 20 may include a request history database which records history of service requests. The request history database may include services requested in the past and personal characteristics of the personnel requested by the client in the past. Personnel extracting unit 11 of the personnel selecting device may set a reference for personnel extraction for each client by referring to the request history database. For example, personnel extracting unit 11 may read personal characteristics corresponding to the currently requested services and/or services similar to the requested services from the request history database, and extract personnel from the job skill storage by using the read personal characteristics. For example, the read personal characteristics may be the one requested a large number of times.

Moreover, personnel extracting unit 11 of the personnel selecting device according to each of the embodiments described above may extract personnel by using a machine learning model. For example, a machine learning model as disclosed in "Discovering Relevance-Dependent Bicluster Structure from Relational Data", Iku Ohama, Takuya Kida, and Hiroaki Arimura, Proceedings of the Twenty-Sixth International Joint Conference on Artificial Intelligence (IJCAI-17), August 2017, page 2578-page 2584 may be used. In this machine learning model, the preferences of input information which are unlikely to be noticed by humans are recognized and input information with the same preference can be automatically grouped. For example, in order to recognize TV viewing preference, a possible usage example is that people with the same preference which is unlikely to be noticed by humans is grouped automatically by inputting information indicating who watched what into the machine learning model as input information.

In the case where the machine learning model is applied to personnel extracting unit 11, information as described below can be used as input information. In other words, the input information is historical data of input information from service input unit 21 which is details of the past client requests, services which can be performed which are the skills of personnel stored in job skill storage 31, and historical data of service evaluation information. By inputting such input information to the machine learning model, a service client and a service provider (that is, the person who performs the service) who are a good match can be automatically grouped. Good matching of the service client and the service provider can be achieved by performing matching among people grouped in the same group. Moreover, each time a service request is added to the machine learning model, or each time evaluation information is added, learning is performed again and updating is performed.

Moreover, in the embodiments described above, only a case has been described where the personnel selecting device is used for personnel selection. However, the technique according to the present disclosure is not limited to such an example. The configuration of the personnel selecting device according to the present disclosure can also be applied to, for example, selection of tools, devices, machines, equipment and the like necessary for performing services.

Moreover, as described above, the technique according to the present disclosure may be implemented using a system, a device, a method, an integrated circuit, a computer program, or a computer-readable recording medium such as a recording disk, or any combination of systems, devices, methods, integrated circuits, computer programs, or recording media. Examples of the computer-readable recording medium include a non-volatile recording medium such as a CD-ROM.

For example, each processing unit included in the embodiments described above is typically realized as a large-scale integration (LSI) which is an integrated circuit. These may be realized as an individual chip, or part or all may be formed into a single chip.

Moreover, circuit integration is not limited to LSI. Integration may be realized with a specialized circuit or a general-purpose processor. After manufacturing the LSI circuit, a field programmable gate array (FPGA) or a reconfigurable processor that allows reconfiguration of the connection or configuration of the inner circuit cells of the LSI circuit can be used.

In the embodiments described above, each structural component may be configured in the form of an exclusive hardware product, or may be realized by executing a software program suitable for the structural component. Each of the structural components may be realized by means of a program executing unit which is, for example, a processor such as a CPU, reading and executing the software program recorded on a hard disk or a recording medium such as a semiconductor memory.

Moreover, part or all of the structural components may each be configured from a detachable integrated circuit (IC) card or a stand-alone module. The IC card and the module are computer systems configured from a microprocessor, ROM, and RAM, for example. The IC card and the module may include the LSI described above or a system LSI. The IC card and the module achieve their functions as a result of the microprocessor operating according to the computer program. The IC card and the module may be tamperproof.

The personnel selecting method according to the present disclosure may be realized by, for example, a processor such as a micro processing unit (MPU) or a CPU, a circuit such as an LSI, an IC card or a stand-alone module. For example, such a personnel selecting method includes obtaining requested service information from the client, extracting personnel matched to the requested service information by referring to information indicating a correspondence relationship between services and personnel, outputting the extracted personnel information to the client, obtaining, from the client, information of the selected personnel from among the extracted personnel, requesting the requested service of the selected personnel, obtaining, from the client, information indicating evaluation details for the performed requested service in natural language, determining an evaluation for the evaluation details by analyzing the character string indicated by the evaluation details, and updating the information indicating the correspondence relationship between the services and the personnel based on the determined evaluation.

Moreover, the technique according to the present disclosure may be implemented as a software program, or a digital signal made of a software program, or a non-transitory computer readable recording medium on which a program is recorded. Moreover, it is needless to say that the aforementioned program can be distributed via a transmission medium such as the Internet. For example, such a program causes a computer to execute obtaining requested service information from a client device, extracting personnel matched to the information of the requested service by referring to information indicating a correspondence relationship between service and personnel, outputting the information of the extracted personnel to the client device, obtaining, from the client device, information of the selected personnel from among the extracted personnel, requesting the requested service of the selected personal, obtaining, from the client device, information indicating evaluation details for the performed requested service in natural language, determining an evaluation for the evaluation details by analyzing a character string indicating the evaluation details, and updating the information indicating the correspondence relationship between the service and the personnel based on the determined evaluation.

Moreover, numbers used in the above description such as ordinal numbers or numerical quantity are merely examples for specifically describing the technique according to the present disclosure, and thus the present disclosure is not limited to the illustrated numbers. Moreover, the connection relations between the structural components are merely examples for specifically describing the technique according to the present disclosure, and thus, the connection relations achieving the functions of the present disclosure are not limited to the illustrated relations.

Moreover, the separation of the function blocks in the block diagrams is merely an example, and plural function blocks may be implemented as a single function block, a single function block may be separated into plural function blocks, or part of functions of a function block may be transferred to another function block. Moreover, the functions of function blocks having similar functions may be processed, in parallel or in a time-division manner, by a single hardware or software.

INDUSTRIAL APPLICABILITY

The technique according to the present disclosure is useful for a technique for selecting, for example, appropriate personnel in response to a request from a client.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

What is claimed is:
1. A personnel selecting device comprising:
a similar service storage which stores information of a service similar to a given service; and
a processor which (i) obtains information of a requested service from a client device, the client device being configured to obtain the information of the requested service from a client, (ii) extracts a similar service similar to the requested service obtained from the client device by referring stored similarity relationships among different services in to the similar service storage, (iii) extracts personnel matched to the similar service by referring to a job skill storage which stores information indicating a correspondence relationship between a service and personnel, the job skill storage being included in a service provider device remote from the personnel selecting device, and (iv) outputs, to the client device, information of the personnel extracted,
wherein the processor (i) obtains, from the client device, information of personnel selected by the client from among the personnel extracted, and (ii) requests the similar service of the personnel selected,
wherein the processor (i) obtains, from the client device, evaluation details for the similar service requested of the personnel selected, the evaluation details being input to the client device as a sound signal input via a microphone, the evaluation details being in natural language, (ii) extracts a character string from the evaluation details obtained from the client device, (iii) determines an evaluation for the evaluation details by analyzing the character string extracted from the evaluation details, and (iv) updates the information in the job skill storage included in the service provider device based on the evaluation determined,
wherein the job skill storage stores a personal characteristic of each personnel and personality traits of a plurality of personnel,
wherein the information of the requested service incudes the requested service and a desirable personality trait, and
wherein the processor extracts personnel matched to the similar service and the desirable personality trait by referring to the job skill storage.
2. The personnel selecting device according to claim 1, wherein the job skill storage stores an evaluation for each service performed by each personnel, and
the processor extracts personnel based on the evaluation for each service performed by each personnel.
3. The personnel selecting device according to claim 1, further comprising
an evaluation information storage which stores an evaluation keyword and an evaluation corresponding to the evaluation keyword,
wherein the processor (i) divides the character string indicated by the evaluation details into a plurality of character strings, (ii) determines the evaluation keyword corresponding to each of the plurality of character strings divided by referring to the evaluation information storage, and (iii) determines an evaluation for the evaluation details based on the evaluation corresponding to the evaluation keyword determined.
4. The personnel selecting device according to claim 1, wherein the processor outputs the information of the personnel extracted to the client device, the information including the personal characteristic of the personnel.

5. The personnel selecting device according to claim 1,
wherein the job skill storage stores, for each personnel, information indicating a time at which the personnel is capable of performing a service, and
the processor outputs the information of the personnel extracted to the client device, the information including the information indicating the time at which the personnel is capable of performing the service.

6. A personnel selecting system comprising:
the personnel selecting device according to claim 1;
the client device which outputs, to the personnel selecting device, the similar service, the information of the personnel selected, and the information indicating the evaluation details; and
the service provider device.

7. A personnel selecting method comprising:
obtaining, by a personal selecting device from a client device, information of a requested service, the client device being configured to obtain the information of the requested service from a client;
extracting, by the personnel selecting device, a similar service similar to the requested service obtained from the client by referring to stored similarity relationships among different services in a similar service storage which stores information of a service similar to a given service, the similar service storage being included in the personnel selecting device;
extracting, by the personnel selecting device, personnel matched to the similar service by referring to a job skill storage which stores information indicating a correspondence relationship between a service and personnel, the job skill storage being included in a service provider device remote from the personnel selecting device;
outputting, by the personnel selecting device to the client device, information of the personnel extracted;
obtaining, by the personnel selecting device from the client device, information of personnel selected by the client from among the personnel extracted;
requesting, by the personnel selecting device, the similar service of the personnel selected;
obtaining, by the personnel selecting device from the client device, evaluation details for the similar service requested of the personnel selected, the evaluation details being input to the client device as a sound signal input via a microphone, the evaluation details being in natural language;
extracting, by the personnel selecting device, a character string from the evaluation details obtained from the client device;
determining, by the personnel selecting device, an evaluation for the evaluation details by analyzing the character string indicated by the evaluation details; and
updating, by the personnel selecting device, the information in the job skill storage included in the service provider device based on the evaluation determined,
wherein the job skill storage stores a personal characteristic of each personnel and personality traits of a plurality of personnel,
wherein the information of the requested service incudes the requested service and a desirable personality trait, and
wherein the personnel matched to the similar service and the desirable personality trait is extracted by referring to the job skill storage.

8. A non-transitory computer-readable recording medium for use in a computer, the recording medium having a computer program recorded thereon for causing the computer to execute:
obtaining, by a personnel selecting device from a client device, information of a requested service, the client device being configured to obtain the information of the requested service from a client;
extracting, by the personnel selecting device, a similar service similar to the requested service obtained from the client device by referring to stored similarity relationships among different services in a similar service storage which stores information of a service similar to a given service, the similar service storage being included in the personnel selecting device;
extracting, by the personnel selecting device, personnel matched to the similar service by referring to a job skill storage which stores information indicating a correspondence relationship between a service and personnel, the job skill storage being included in a service provider device remote from the personnel selecting device;
outputting, by the personnel selecting device to the client device, information of the personnel extracted;
obtaining, by the personnel selecting device from the client device, information of personnel selected by the client from among the personnel extracted;
requesting, by the personnel selecting device, the similar service of the personnel selected;
obtaining, by the personnel selecting device from the client device, evaluation details for the similar service requested of the personnel selected, the evaluation details being input to the client device as a sound signal input via a microphone, the evaluation details being in natural language;
extracting, by the personnel selecting device, a character string from the evaluation details obtained from the client device;
determining, by the personnel selecting device, an evaluation for the evaluation details by analyzing the character string indicated by the evaluation details; and
updating, by the personnel selecting device, the information in the job skill storage included in the service provider device based on the evaluation determined,
wherein the job skill storage stores a personal characteristic of each personnel and personality traits of a plurality of personnel,
wherein the information of the requested service incudes the requested service and a desirable personality trait, and
wherein the personnel matched to the similar service and the desirable personality trait is extracted by referring to the job skill storage.

\* \* \* \* \*